(12) United States Patent
Kim

(10) Patent No.: US 6,981,183 B2
(45) Date of Patent: Dec. 27, 2005

(54) APPARATUS AND METHOD FOR TESTING BIT ERROR RATE OF DSRC ITS SYSTEM

(75) Inventor: Dong-Hyun Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 09/993,518

(22) Filed: Nov. 27, 2001

(65) Prior Publication Data

US 2002/0066055 A1 May 30, 2002

(30) Foreign Application Priority Data

Nov. 27, 2000 (KR) ............................. 2000-70917

(51) Int. Cl.⁷ ............................................ G06F 11/00
(52) U.S. Cl. .................................................. 714/704
(58) Field of Search ............................ 714/704, 707, 714/746, 747, 748, 749, 750, 751, 752, 755, 714/758

(56) References Cited

U.S. PATENT DOCUMENTS 3,934,224 A * 1/1976 Dulaney et al. ............ 714/750
6,073,257 A * 6/2000 Labonte et al. ............ 714/704
6,292,912 B1 * 9/2001 Cloke et al. ................ 714/718

* cited by examiner

Primary Examiner—Albert Decady
Assistant Examiner—James C Kerveros
(74) Attorney, Agent, or Firm—Fleshner & Kim, LLP

(57) ABSTRACT

A BER testing apparatus of a DSRC ITS includes a personal computer for commanding a BER test, receiving a BER value according to the BER test command, and displaying the BER value. The testin apparatus also includes a roadside equipment for transmitting a BER test message in accordance to the BER test command. Additionally, the testing apparatus includes an on-board equipment for comparing the BER test message received from the roadside equipment with a previously stored BER test message to compute a BER value. Thereafter, the on-board equipment transmits the computed BER value to the roadside equipment. Since the on-board equipment and the roadside equipment are used without any additional testing unit and the radio transmission quality can be measured by a simple switch manipulation, the BER testing can be performed simply.

5 Claims, 4 Drawing Sheets

| FCMS | MDS (1) | MDS (2) | ... | MDS (n) | ACTS (1) | ACTS (2) | ... | ACTS (k) |

| PR 2 | CSW 2 | MAC 2 | MSDU 65 | CRC 2 |

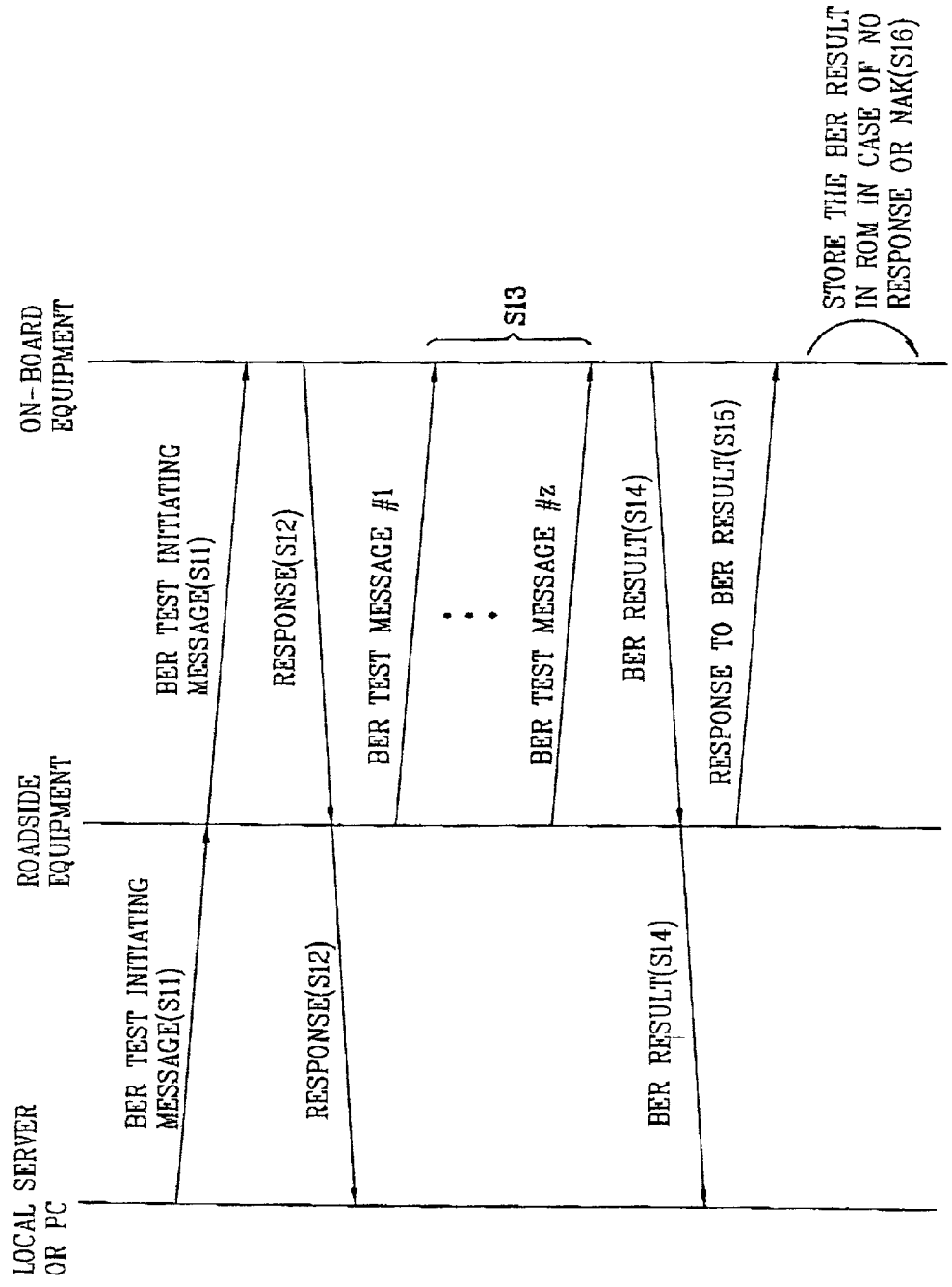

APPARATUS AND METHOD FOR TESTING BIT ERROR RATE OF DSRC ITS SYSTEM

BACKGROUND OF THE INVENTION

1. Field of the Invention

The present invention relates to a dedicated short range communication (DSRC) type intelligent transport system (ITS) and, more particularly, to an apparatus and method for testing a bit error rate (BER) of the DSRC ITS.

2. Background of the Related Art

In general, an intelligent transport system has been introduced to have a smooth flow of information, without discontinuation of information, between a vehicle and a road. This is accomplished by adapting a related technology such as an electronic control and information communication system to the existing traffic system, which may include a road, a vehicle, and a signal system.

Especially, among the information communication technological fields, a radio communication technique for a bidirectional communication between the road and the vehicle is recognized as the most important field. The present invention pays much attention to the DSRC-based ITS, a radio communication technique for the next generation ITS service.

The DSRC is one of the radio communication standards between the vehicle and the road. A vehicle with an on-board equipment (OBE) and a road side equipment (RSE), installed along the roadside, communicate bi-directionally using a high-speed radio packet in a pertinent communication area, while traveling at a high speed along the roadside where the roadside equipment is installed.

FIG. 1 is a drawing illustrating the construction of a general DSRC ITS network. A general DSRC ITS network includes on-board equipment 10 mounted at a vehicle for requesting an ITS service; roadside equipment 20 installed at a streetlight or a signal light of roadside for making a bi-directional radio communication with the on-board equipment 10; a local server 30 for making a wired communication with the roadside equipment 20 to collect traffic information of a pertinent area and having a database for responding to a user's request; and a traffic information center 50 connected to the local server 30 through a communication network 40 for collecting all of the traffic information and collecting information related to other ITS networks. The local server 30 is connected to the roadside equipment by ethernet, an Asymmetric Digital Subscriber Line (ADSL), or an Integrated Services Digital Network (ISDN).

The DSRC ITS network provides various ITS services by having functions such as a traffic information collection and utilization, a forward road situation display, a bypass and signal light control, a public transportation management and guide, and a wireless charge payment of a freeway toll gate.

Like the general communication system, communication quality is very important for the DSRC ITS. Accordingly, after a manufacturer manufactures equipment (the roadside equipment or the on-board equipment) in a factory, the manufactured equipment is subjected to testing of its radio communication quality or the manufactured equipment is installed at a specific place to check its communication area or its communication quality, for which a BER test is performed. In addition, in order to check the performance of a system, a service operator may perform the BER testing at any time.

FIG. 2 is a drawing illustrating the construction of a BER testing apparatus of the ITS, in accordance with the background art. The BER testing apparatus includes a roadside equipment simulator 60, having a general function of the roadside equipment and the function of a standard signal generator. The signal generator supports an amplitude shift keying (ASK) modulation method of the ITS. The BER testing apparatus also has a testing unit 70 for controlling the strength of a test signal transmitted from the roadside equipment simulator 60 and transmitting the test signal to the on-board equipment 10. Additionally, the testing unit 70 measures a BER of the test signal feedback from the on-board equipment 10.

The testing unit 70 includes an attenuator 71 for attenuating the strength of the test signal, transmitted from the roadside equipment simulator 60, to a predetermined size and transmitting the test signal to the on-board equipment 10. A BER measuring unit 72 compares the test signal received from the roadside equipment simulator 60 and the test signal feedback from the on-board equipment 10. The operation of the BER testing unit of the ITS constructed, as described above, will now be explained.

The roadside equipment simulator 60 transmits a pre-set signal for the BER testing, that is, a test signal such as a PN9 or PN15, to the testing unit 70. The attenuator 71 of the testing unit 70 attenuates the received test signal to a size previously determined by a user and transmits it to the on-board equipment 10. The on-board equipment 10 feeds the test signal received from the testing unit 70 back to the testing unit 70. The BER measuring unit 72 compares the signal received from the on-board equipment 10 and the test signal received from the roadside equipment simulator 60 to measure the BER and displays the measured BER value on a display unit (not shown in FIG. 2).

However, the BER testing of the ITS of the background art has a shortcoming in that a high-priced testing unit is used to measure the BER. Additionally, since only the BER of the test data, such as PN9 and PN15, previously set for the BER testing of a transmission and reception signal in a radio channel environment is tested, it is not possible to test a BER of a transmitted and received frame operated in the actual ITS.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a BER testing apparatus of a DSRC ITS that is capable of measuring a radio transmission quality using on-board equipment and roadside equipment, without a testing unit.

Another object of the present invention is to provide a BER testing apparatus and method of a DSRC ITS that are capable of measuring a BER of a frame, communicated in an actual ITS network, using on-board equipment and roadside equipment.

Still another object of the present invention is to provide a BER testing apparatus and method of a DSRC ITS that are capable of measuring a BER of each of a plurality of on-board equipment, at one time, by measuring the BER using an on-board equipment, a roadside equipment, and a frame operable in an actual ITS network.

To achieve at least the above objects in whole or in part, there is provided a BER testing apparatus of a DSRC ITS including: a personal computer (PC) for commanding a BER test, receiving a BER value according to the BER test command, and displaying the BER value; a roadside equipment for transmitting a BER test message according to the BER test command; and an on-board equipment for comparing the BER test message, received from the roadside equipment, with a previously stored BER test message to compute a BER value and for transmitting the computed BER value to the roadside equipment.

To achieve at least these advantages in whole or in part, there is further provided a BER testing method of a DSRC ITS including: recognizing an operation mode by a roadside equipment and an on-board equipment according to an output of a switch; starting a BER testing between the roadside equipment and the on-board equipment according to a BER test command, if the operation mode is a BER test mode; transmitting a BER test message from the roadside equipment to the on-board equipment and performing a BER check for the receiving BER test message, by the on-board equipment; and reporting a BER value according to the BER check.

To achieve at least these advantages in whole or in part, there is further provided a BER testing method of a DSRC ITS including: transmitting a BER testing initiation message from a PC or a local server to a roadside equipment; recognizing an operation of the roadside equipment as a BER test mode, according to the BER testing initiation message, and transmitting the BER testing initiation message to the on-board equipment; recognizing the operation mode of the on-board equipment as a BER test mode, according to the BER testing initiation message; storing the number of data to be received included in the BER testing initiation message, and transmitting a response to the BER testing initiation message to the roadside equipment; transmitting the response to the BER testing initiation testing message to the personal computer or the local server, and transmitting the BER test message from the roadside equipment to the on-board equipment; comparing data of the received BER test message and data of the BER test message, which has been previously stored in a memory of the on-board equipment, and measuring a BER, after the data of the BER test message is received as many as the stored data to be received; transmitting the measured BER value from the on-board equipment to the roadside equipment; transmitting the BER value to the personal computer or the local server and transmitting a response to receipt of the BER value to the on-board equipment; and storing the BER value in the memory of the on-board equipment, if no response is received to the receipt of the BER value.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 7 illustrates a BER testing method of the DSRC ITS in accordance with the preferred embodiment of the present invention.

DETAILED DESCRIPTION OF PREFERRED EMBODIMENTS

Figure 1:
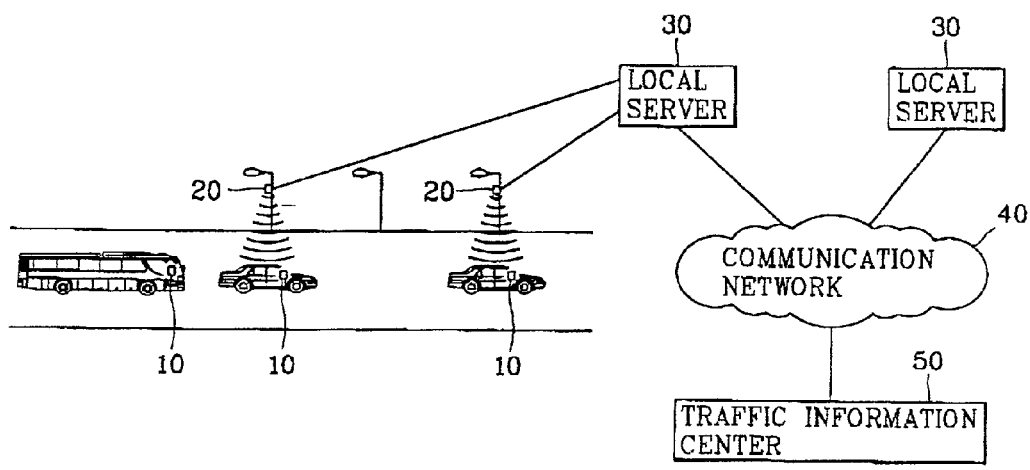
FIG. 1 illustrates the construction of a background art DSRC ITS network.
Figure 2:
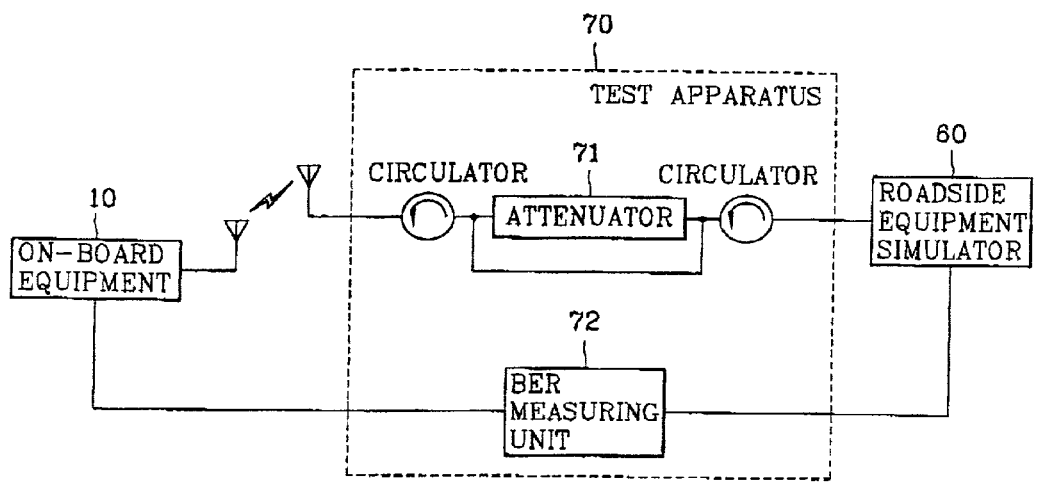
FIG. 2 illustrates the construction of a BER testing unit of an ITS, in accordance with the background art.
Figure 3:
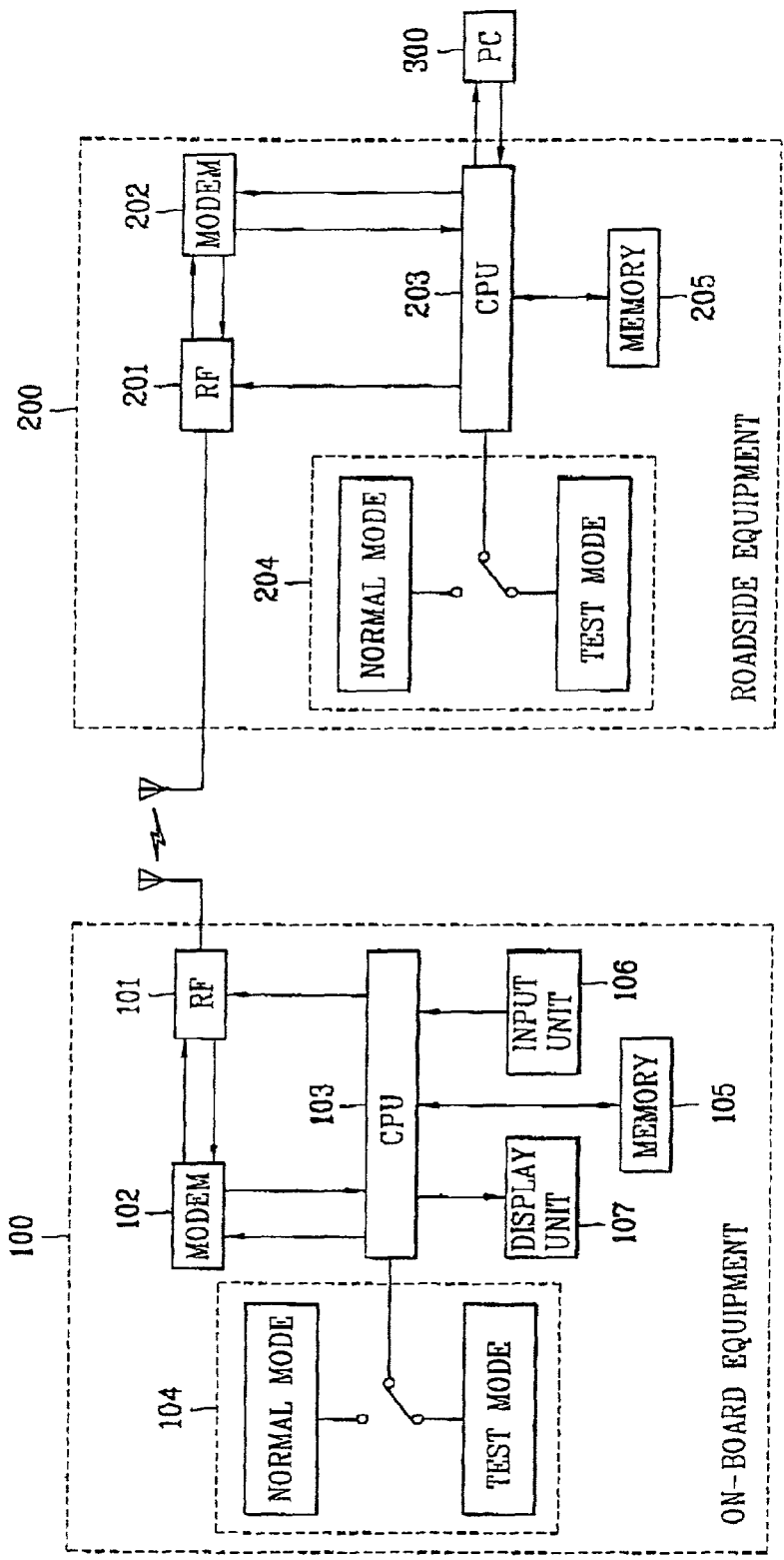
FIG. 3 illustrates the construction of a BER testing unit of a DSRC ITS in accordance with a preferred embodiment of the present invention.

FIG. 3 is a schematic block diagram showing the construction of a BER testing unit of a DSRC ITS in accordance with a preferred embodiment of the present invention. The BER testing unit includes a personal computer 300 for commanding an initiation of the BER testing and receiving a BER value according to the command and displaying it; a roadside equipment 200 for transmitting a BER test message to initiate the BER testing; and an on-board equipment 100 for comparing the BER test message received from the roadside equipment 200 with a previously stored BER test message to measure a BER. A local server 30, instead of the personal computer 300, may be connected to the roadside equipment 200 to construct the BER testing unit.

The on-board equipment 100 includes an RF unit 101 for converting a Radio Frequency (RF) signal, used for communicating with the roadside equipment 200 in a DRSC method, to a digital signal and converting the digital signal to an RF signal; a modem 102 for performing a media access control (MAC) function for a channel access to the roadside equipment 200 in a time division multiple access (TDMA) method, for performing a cyclic redundancy code (CRC) check on the receiving data to judge whether an error has occurred, and for determining whether received data containing an error is to be discarded under the control of a CPU 103; a CPU 103 for controlling a general operation of the on-board equipment 100; a switch 104 for switching an operation mode of the on-board equipment according to an external manipulation; a memory 105 for storing the BER test message and the measured BER value; an input unit 106 for receiving an input from a user and transmitting it to the CPU 103; and a display unit 107 for displaying a state of the on-board equipment 100 and user information under the control of the CPU 103.

The roadside equipment 200 includes an RF unit 201 for converting an RF signal, used for communicating with the on-board equipment 100 in a DRSC method, to a digital signal and converting the digital signal to an RF signal; a modem 202 for performing a MAC function for connecting a channel to the on-board equipment 100 using a TDMA method, for performing a CRC on the received data to judge whether an error has occurred, and for determining whether received data containing an error is to be discarded under the control of a CPU 203; a CPU 203 for controlling a general operation of the roadside equipment 200; a switch 204 for switching an operation mode of the roadside equipment according to an external manipulation; and a memory 205 for storing the BER test message.

Figures 4, 5, 6:
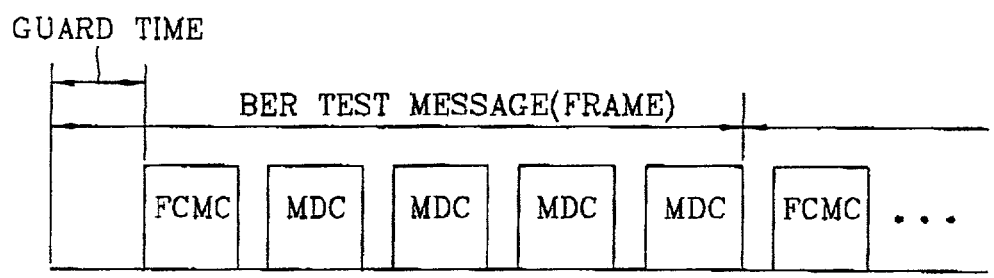
FIG. 4 illustrates a structure of a communication frame used for an ITS.
FIG. 5 illustrates a structure of a BER test message based on the communication frame of FIG. 4.
FIG. 6 illustrates an internal structure of the MDC shown in FIG. 5.

FIG. 4 is a drawing illustrating a structure of a communication frame used for an ITS service in an ITS. The communication frame includes several slots on a time axis. Each slot has the same length and includes a frame control message slot (FCMS), a message data slot (MDS) and an activation slot (ACTS), depending on characteristics of the data.

That is, the communication frame includes one FCMS, 'n'($0 \leq n \leq 8$) number of MDSs, and 'k'($0 \leq k \leq 8$) number of ACTSs. The sum (n+k) of the MDSs and the ACTSs contained in one communication frame is 1 or more and 8 or less ($1 \leq n+k \leq 8$). Accordingly, the maximum length of the communication frame is as long as 9 slots, containing one FCMS. Its minimum length is two slots containing one FCMS.

The first slot of the communication frame is necessarily an FCMS and ACTSs are positioned at the end of the frame. The length of the frame is determined by the roadside equipment 200 for every frame period. The FCMS is exclusively used for a backward link, providing general information on the channel use to the on-board equipment 100. The FCMS includes system information such as a communication profile and slot allocation information The MDS is positioned after the FCMS or a different MDS and used as a forward link from the on-board equipment 100 to the roadside equipment 200 or as a backward link from the roadside equipment 200 to the on-board equipment 100, for exchanging data between them. One frame may include the maximum of 8 MDSs.

ACTS is exclusively used as the forward link for the on-board equipment 100 to request an allocation of the MDS from the roadside equipment 200. One frame may include the maximum of 8 ACTSs.

Each slot includes several channels. That is, the FCMS includes a frame control message channel (FCMC) and the MDS includes several message data channels (MDC). Also, the ACTS includes several activation channels (ACTC).

In the present invention, a BER test message is set for the BER testing using the communication frame of FIG. 4.

FIG. 5 is a drawing illustrating a structure of a BER test message using the communication frame of FIG. 4. The BER test message has a Manchester coded serial data form. That is, the BER test message includes 1 FCMC and four MDCs. In addition, in order to reduce interference between BER test messages (frames) and between channels, a guard time is given. Each MDC for the BER testing is set as a certain value while conforming to a DSRC standard.

FIG. 6 is a drawing illustrating an internal structure of an MDC within the BER test message of FIG. 5. The MDC includes a preamble field (PR), a channel synchronization word field (CSW), a MAC control field, a MAC service data unit field (MSDU), and a cyclic redundancy error check sequence (CRC) field. The PR, having a 2 byte length, is at the head of the MDC and has the value of '0xAAAA', that is, '10101010 10101010' from the most significant bit (MSB). The CSW, having a 2 byte length, is a field for a channel synchronization and has a value of '0x4B3E', that is, '10011011 00111110'. The MAC, having a 2 byte length, indicates whether it is a forward data or a backward data and also indicates the length of the MSDU. The MSDU, having a 65 byte length, indicates data transmitted and received between the roadside equipment 200 and the on-board equipment 100. The CRC, having a 2 byte length, is used to detect whether there is an error in data of the fields, except the PR and CSW fields. A generator polynomial g(x) of the CRC is as follows:

$$g(x)=x^{16}+x^{12}+x^5+1$$

Accordingly, the BER test message including 5 slots, preferably 5 channels, includes determined data (i.e., the MDC or, preferably, the MSDU). The determined data (MSDU) is stored prior to the BER test in each memory 205, 105 of the roadside equipment 200 and the on-board equipment 100, respectively. Thus, the roadside equipment 200 and the on-board equipment 100 know the actual data of the BER test message communicated between them.

The operation of the BER testing unit of the DSRC ITS in accordance with a preferred embodiment of the present invention will now be explained with reference to FIG. 7. In order to check a performance of the equipment (the roadside equipment and the on-board equipment) after it is manufactured, a hardware switch of the equipment is preferably manipulated to perform the BER testing. If the equipment is installed at the ITS network, the BER testing is preferably performed through remote control.

(A) BER Testing by Manipulating a Hardware Switch:

A tester manipulates a switch 104 of the on-board equipment 100 and a switch 204 of the roadside equipment 200 to a BER test mode position. Then, the CPU 103 of the on-board equipment 100 and the CPU 203 of the roadside equipment 200 recognize the BER test mode and change the corresponding modem 102 and 202 to a test status.

Thereafter, when the tester commands initiation of a BER testing through the personal computer 300, the roadside equipment 200 transmits the BER testing initiation message received from the personal computer 300 to the on-board equipment 100 (step S11). If the local server 30, not the personal computer 300, is connected to the roadside equipment 200, the tester may command initiation of the BER testing through the local server 30 and the roadside equipment 200 may transmit the BER testing initiation message received from the local server 30 to the on-board equipment 100 (step S11).

The BER testing initiation message includes an identifier (ID) of the on-board equipment 100 that will perform the BER testing and the number (m) of the BER test message data to be received. Since the ID of the on-board equipment 100 performing the BER testing can be arbitrarily assigned, the BER measurement can be performed for a plurality of on-board equipments 100 at one time.

After receiving the BER testing initiation message, the on-board equipment 100 stores the number (m) of MDC data of the BER test message to be received in the memory 105 and transmits a response to the BER testing initiation message to the roadside equipment 200 (step S12). The roadside equipment 200 transmits the response to the personal computer 300 or the local server 30 to inform it that BER testing is ready to start (step S12).

And then, the roadside equipment 200 transmits the BER test message, of FIG. 5, to the on-board equipment 100 (step S13). At this time, the roadside equipment 200 generates the 16 bit CRC value for each of the 4 MDCs constructing the BER test message, using the generator polynomial (g(x)), and transmits the BER test message to the on-board equipment 100.

Here, when the 'z' BER test messages are received (wherein z is the number of the BER test message), the total numbers of received MDCs becomes z*4.

When the m MDCs contained in the BER test messages are received, the onboard equipment 100 compares the received MDC data with the MDC data stored in the memory 105 to check whether they are identical to each other, thereby performing the BER testing.

The BER testing will now be described in detail. The modem 102 of the onboard equipment 100 generates the CRC for the received BER test message and compares the generated CRC with the CRC of the BER test message stored to memory 105. The CRC of the stored test message is generated in a similar fashion to that of the received BER test message.

If the two CRCs are identical to each other, the modem 102 determines that no error has occurred to the received BER test message data. If, however, the two CRCs are not identical to each other, the modem 102 determines that an error has occurred to the received BER test message.

If the operation of the of the on-board equipment 100 is set for a normal mode (a service mode), rather than the BER test mode, and if there is an error in the received data according to the result of the CRC testing, the modem 102 discards the MDC containing the error. However, if the operation mode of the on-board equipment 100 is set to the BER test mode, even if the data is not normally received according to the result of the CRC testing, the modem 102 transmits the received data to the CPU 103 so that the received data can be stored in the memory 105.

That is, in the case of the BER test mode, the received data (MDC, preferably, the MSDU) are all transmitted to the CPU 103 without performing the CRC testing. The CPU 103 stores the data (MSDU) for the BER testing received from the modem 102 in the memory 105. When the CPU 103 receives the 'm' number of MSDUs, it computes a BER for the received and stored BER test data.

That is, since an MSDU is 65 bytes, the CPU 103 computes the number of data with an error, from the total data number (m*65 byte) of received test data bytes, and takes the resulting value as a BER value. And then, the CPU 103 displays the number of the received data and the number of data with an error on the display unit 107 so that the tester can check it.

After the BER value is computed, the on-board equipment 100 transmits the BER value to the roadside equipment 200 and waits for a response (step S14). The roadside equipment 200 transmits the received BER value to the personal computer 300 or to the local server 30 (step S14) and transmits a response that the BER value has been properly received to the on-board equipment 100 (step S15). However, if no response is received from the roadside equipment 200 for a predetermined time or a response is received indicating that the BER value has not been properly received, the on-board equipment 100 determines that the radio communication environment is poor and stores the BER value in the memory 105 (step S16).

Thereafter, when the roadside equipment 200 requests the BER value, the onboard equipment 100 transmits the stored BER value to the roadside equipment 200.

When the BER testing is desired to be terminated, the tester directly manipulates the switches 104 and 204 of the on-board equipment 100 and the roadside equipment 200 to a normal mode position.

(B) BER Testing by Remote Control:

In the case that the on-board equipment and the roadside equipment are installed in the ITS network, the tester may not readily manipulate the hardware switches 104 and 204 of the equipments. Therefore, the tester commands initiation of the BER testing through the local server 30 connected to the roadside equipment 300. On the other hand, the personal computer 300 can be connected to the roadside equipment 300 to perform the BER testing. In such a case, the tester may directly manipulate the switch 204 of the roadside equipment 300 to a BER test mode.

When the BER testing initiation message, shown in FIG. 5, is transmitted through the local server 30, the roadside equipment 200 transmits the BER testing initiation message to the on-board equipment 100 (step S11). Upon receiving the BER testing initiation message, the CPU 103 of the on-board equipment 100 recognizes the operation mode identified in the BER testing initiation message as the BER test mode and changes the modem 102 to a test status. Thereafter, the BER testing operation is performed in the same manner as that of the BER testing by the manipulation of the hardware switch, as described above (steps S12–S16).

If the BER testing is desired to be terminated, the tester commands the BER testing termination through the local server 30. The roadside equipment 200 and the on-board terminal 100 change their operation mode from the BER test mode to the normal mode, accordingly.

As so far described, the apparatus and method for testing a BER of the DSRC ITS of the present invention has many advantages. For example, since the on-board equipment and the roadside equipment are used without any additional testing unit and the radio transmission quality can be measured by a simple switch manipulation, the BER testing can be simply performed.

Additionally, since the BER is measured for the frame operated in the actual ITS network, using the on-board equipment and the roadside equipment, a reliability for measurement of the BER can be improved.

Lastly, since the BER is measured using the on-board equipment, the roadside equipment, and the frame actually operable in the ITS network, the BER can be measured for a plurality of on-board equipments at one time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A bit error rate (BER) testing apparatus, comprising:
   a computer that commands a BER test through a BER test command, receives a BER value according to the BER test command, and displays the BER value;
   a roadside equipment that transmits a BER test message according to the BER test command; and
   an on-board equipment that compares the BER test message received from the roadside equipment with a previously stored BER test message to compute the BER value and transmits the BER value to the computer via the roadside equipment,
   wherein the BER test message comprises:
   one frame control message channel (FCMC) positioned at the front of the BER test message, the FCMC having system information and exclusively used for a backward link; and
   a plurality of message data channels (MDCs) comprising data to be transmitted between the roadside equipment and the on-board equipment, the plurality of MDCs set as a certain value conforming to a dedicated short range communication (DSRC) standard and used for the backward link and a forward link.

2. The apparatus of claim 1, wherein each of the plurality of MDCs comprises:
   a preamble field (PR) positioned at the front of the MDC;
   a channel synchronization word field (CSW) that provides a channel synchronization;

a media access control (MAC) field that indicates whether the MDC is forward data or backward data and indicates a data length;

a MAC service data unit field (MSDU) that contains data known commonly by the roadside equipment and the on-board equipment; and a cyclic redundancy error check sequence (CRC) field used to detect whether there is an error in any field other than the PR and the CSW fields.

3. A bit error rate (BER) testing method, comprising:

recognizing, with a roadside equipment and an on-board equipment, an operation mode determined by an output of a switch;

starting a BER test between the roadside equipment and the on-board equipment according to a BER test command, if the operation mode is a BER test mode;

transmitting a BER test message from the roadside equipment to the on-board equipment and performing a BER check on the received BER test message with the on-board equipment; and reporting a BER value according to the BER check, wherein the BER test message comprises:

one frame control message channel (FCMC) positioned at the front of the BER test message, the FCMC having system information and exclusively used for a backward link; and a plurality of message data channels (MDCs) comprising data to be transmitted between the roadside equipment and the on-board equipment, the plurality of MDCs set as a certain value conforming to a dedicated short range communication (DSRC) standard and used for the backward link and a forward link.

4. The method of claim 3, wherein each of the plurality MDCs comprises:

a preamble field (PR) positioned at the front of the MDC;

a channel synchronization word field (CSW) that provides a channel synchronization;

a media access control (MAC) field that indicates whether the MDC is forward data or backward data and indicates a data length;

a MAC service data unit field (MSDU) that contains data known commonly by the roadside equipment and the on-board equipment; and a cyclic redundancy error check sequence field used to detect whether there is an error in any field other than the PR and the CSW fields.

5. A bit error rate (BER) testing method of a dedicated short range communication (DSRC) intelligent transport system (ITS), comprising:

transmitting a BER testing initiation message from a PC or a local server to a roadside equipment;

recognizing an operation mode of the roadside equipment as a BER test mode, based on the BER testing initiation message, and transmitting the BER testing initiation message to an on-board equipment;

recognizing the operation mode of the on-board equipment as the BER test mode, based on the BER testing initiation message;

storing a number identifying an amount of data to be received by the on-board equipment, included in the BER testing initiation message;

transmitting a response to the BER testing initiation message from the on-board equipment to the roadside equipment;

transmitting the response to the BER testing initiation testing message to the PC or the local server and transmitting a BER test message from the roadside equipment to the on-board equipment;

comparing data of the BER test message received by the on-board equipment with data of a standard BER test message, previously stored in a memory of the on-board equipment, and measuring a BER value;

transmitting the measured BER value from the on-board equipment to the roadside equipment;

transmitting the BER value to the PC or the local server and transmitting a response to receipt of the BER value to the on-board equipment; and storing the BER value in the memory of the on-board equipment, if no response is received indicating the receipt of the BER value, wherein the BER test message comprises:

one frame control message channel (FCMC) positioned at the front of the BER test message, the FCMC having system information and exclusively used for a backward link; and a plurality of message data channels (MDCs) comprising data to be transmitted between the roadside equipment and the on-board equipment, the plurality of MDCs set as a certain value conforming to a DSRC standard and used for the backward link and a forward link.

* * * * *